United States Patent
Yoon et al.

(10) Patent No.: US 9,402,524 B2
(45) Date of Patent: Aug. 2, 2016

(54) DEBRIS DETECTING UNIT AND ROBOT CLEANING DEVICE HAVING THE SAME

(75) Inventors: Sang Sik Yoon, Suwon-si (KR); Kang Nam Kim, Seongnam-si (KR); Jun Hwa Lee, Suwon-si (KR); Hwi Chan Jang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1109 days.

(21) Appl. No.: 13/404,762

(22) Filed: Feb. 24, 2012

(65) Prior Publication Data

US 2012/0222224 A1 Sep. 6, 2012

(30) Foreign Application Priority Data

Mar. 4, 2011 (KR) .............................. 10-2011-19359
Sep. 1, 2011 (KR) .............................. 10-2011-88573

(51) Int. Cl.
*A47L 9/28* (2006.01)
*A47L 11/33* (2006.01)
*A47L 11/40* (2006.01)
*G05D 1/02* (2006.01)

(52) U.S. Cl.
CPC ............. *A47L 11/33* (2013.01); *A47L 11/4013* (2013.01); *G05D 1/021* (2013.01); *A47L 9/281* (2013.01); *A47L 9/2815* (2013.01); *A47L 2201/02* (2013.01); *A47L 2201/024* (2013.01); *A47L 2201/06* (2013.01); *G05D 2201/0203* (2013.01)

(58) Field of Classification Search
CPC ... A47L 9/281; A47L 9/2815; A47L 2201/02; A47L 2201/024; A47L 2201/06; G05D 1/021; G05D 2201/0203

USPC .................................................... 15/319, 347
IPC ............................................................ A47L 9/28
See application file for complete search history.

(56) References Cited

U.S. PATENT DOCUMENTS

| | | | | |
|---|---|---|---|---|
| 4,601,082 A * | 7/1986 | Kurz | | 15/319 |
| 5,319,827 A * | 6/1994 | Yang | | 15/319 |
| 5,787,545 A * | 8/1998 | Colens | | 15/319 |
| 9,015,897 B2 * | 4/2015 | Jonsson et al. | | 15/319 |
| 2005/0166355 A1 | 8/2005 | Tani | | |

(Continued)

FOREIGN PATENT DOCUMENTS

DE 102007036157 2/2009
WO 01-08544 2/2001

OTHER PUBLICATIONS

Extended European Search Report dated May 22, 2012 issued in corresponding European Patent Application No. 12156422.3.

*Primary Examiner* — David Redding
(74) *Attorney, Agent, or Firm* — Staas & Halsey LLP

(57) ABSTRACT

A robot cleaning device includes a debris detecting unit. The robot cleaning device includes a body, a driving unit to enable the body to travel, a drum brush unit provided at the body, to sweep up debris, using a brush and a rotating drum, a debris box to store the debris swept up by the drum brush unit, a debris detecting unit to detect whether debris has been introduced into the debris box through the drum brush unit during a cleaning operation, and a controller to determine whether debris is introduced into the debris box and whether debris has been accumulated in the debris box in a predetermined amount, based on introduction or non-introduction of debris detected by the debris detecting unit.

17 Claims, 19 Drawing Sheets

(56) References Cited

U.S. PATENT DOCUMENTS

| | | |
|---|---|---|
| 2005/0183229 A1 | 8/2005 | Uehigashi |
| 2005/0212478 A1 | 9/2005 | Takenaka |
| 2007/0214597 A1* | 9/2007 | Suzuki .......................... 15/339 |
| 2012/0079670 A1* | 4/2012 | Yoon et al. ..................... 15/319 |
| 2013/0198993 A1* | 8/2013 | Jonsson et al. ................. 15/339 |

\* cited by examiner

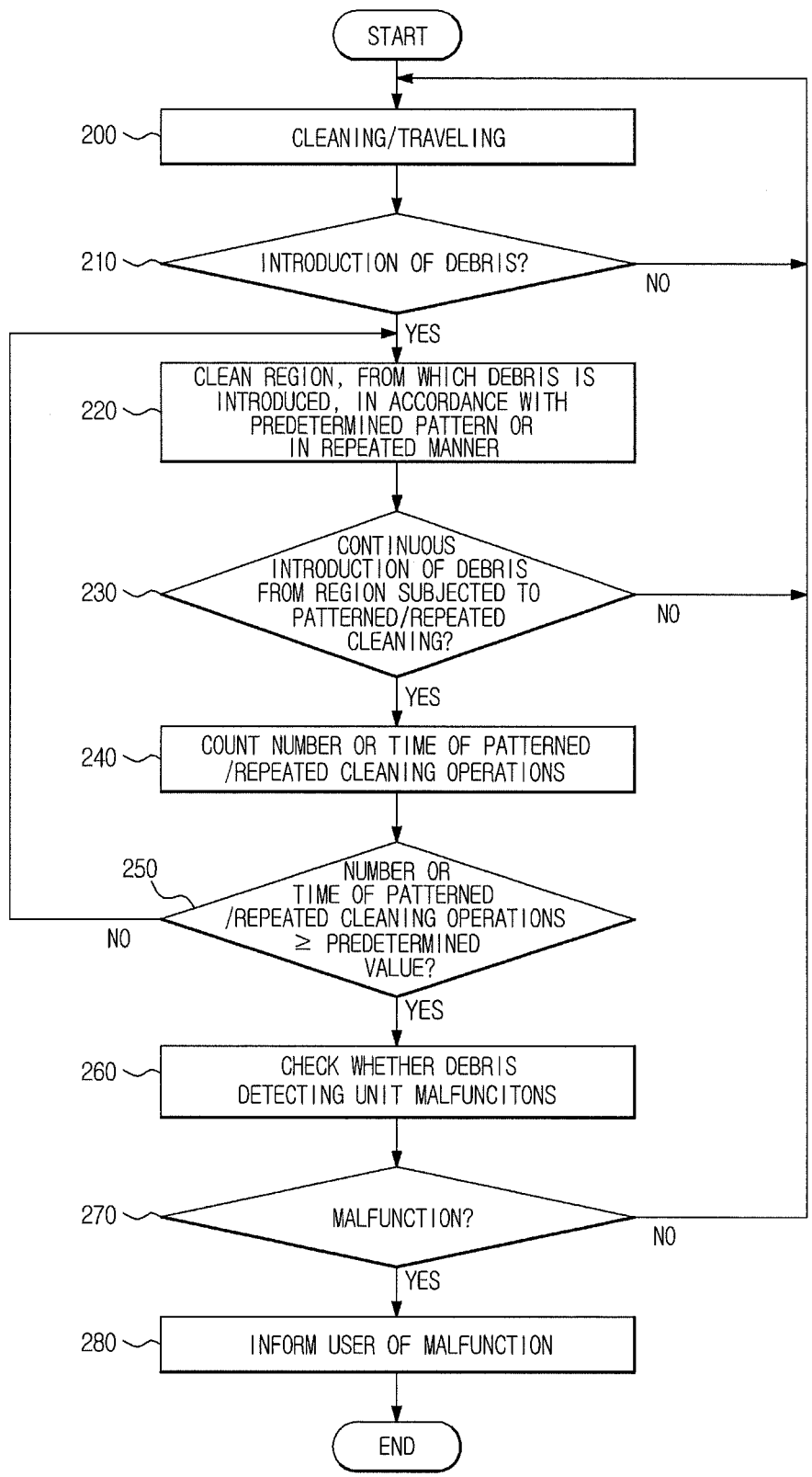

DEBRIS DETECTING UNIT AND ROBOT CLEANING DEVICE HAVING THE SAME

CROSS-REFERENCE TO RELATED APPLICATIONS

This application claims the benefit of Korean Patent Application Nos. 10-2011-19359 and 10-2011-88573, respectively filed on Mar. 4, 2011 and Sep. 1, 2011 in the Korean Intellectual Property Office, the disclosures of which are incorporated herein by reference.

BACKGROUND

1. Field

Embodiments relate to a robot cleaning device including a debris detecting unit, and more particularly, to a robot cleaning device including a debris detecting unit having improved debris detecting performance.

2. Description of the Related Art

An autonomous robot is a device for performing a desired task while traveling about a certain region without being operated by a user. Such a robot may substantially operate autonomously. Autonomous operation may be achieved in various manners. For example, the robot may travel about a certain region along a predetermined path or may travel about a certain region under the condition that there is no predetermined path of the robot.

A robot cleaning device is a device for cleaning a floor in a cleaning region while traveling about the cleaning region without being operated by a user. In detail, such a robot cleaning device may perform a vacuum cleaning operation and a wiping operation in a home. Here, debris may mean (soil) dust, mote, powder, scrap, and other dust particles, which may be collected by a vacuum cleaner or an automatic or semi-automatic cleaning device.

Conventional robot cleaning devices detect debris on a floor in a cleaning region when cleaning the floor while travelling about the cleaning region, in order to concentratedly or repeatedly clean an area where debris is detected. Also, conventional robot cleaning devices include a debris amount detecting unit installed in a debris box while including a light emitter and a light receiver. As debris is accumulated in the debris box, light to be transmitted to the light receiver may be shielded. This shielding is detected to identify the amount of the accumulated debris.

Of course, in a conventional robot cleaning device (disclosed in, for example, Korean Unexamined Patent Publication No. 10-2005-0073082), several sensors or several kinds of sensors are installed to detect introduction of debris from a floor into a debris box, and to detect the amount of debris in the debris box. In this case, there is a problem in that too many sensors are unnecessarily installed, so that an increase in manufacturing costs may occur or the sensors may occupy a large space in the interior of the robot cleaning device.

The above-mentioned conventional robot cleaning device also has a problem in that, even when one or more sensors malfunction during a cleaning operation, the cleaning operation may be continuously carried out without necessary measures, except for issuing an alarm to the user, or may be completely stopped.

Also, conventional robot cleaning devices, which include debris sensors as mentioned above, perform a cleaning task based on a predetermined single reference value, without reflecting the cleaning task environment varying the kind of debris or the amount of debris. For this reason, it may be difficult for such conventional robot cleaning devices to achieve effective cleaning.

SUMMARY

Therefore, it is an aspect to provide a robot cleaning apparatus including a debris detecting unit having economically-installable sensors while optimizing a debris detection function thereof.

Additional aspects will be set forth in part in the description which follows and, in part, will be obvious from the description, or may be learned by practice of the invention.

In accordance with one aspect, a robot cleaning device may include a body, a driving unit to enable the body to travel, a drum brush unit provided at the body, to sweep up debris, using a brush and a rotating drum, a debris box to store the debris swept up by the drum brush unit, a debris detecting unit to detect whether debris has been introduced into the debris box through the drum brush unit during a cleaning operation, and a controller to determine whether debris is introduced into the debris box and whether debris has been accumulated in the debris box in a predetermined amount, based on introduction or non-introduction of debris detected by the debris detecting unit.

The debris detecting unit may include a light emitter to emit beams, and a light receiver to receive the emitted beams. The controller may determine whether debris is introduced into the debris box and whether debris has been accumulated in the debris box in the predetermined amount, in accordance with an amount of the beams received by the light receiver.

The controller may determine whether debris is introduced into the debris box and whether debris has been accumulated in the debris box in the predetermined amount, based on a pattern of a variation in the amount of the beams received by the light receiver depending on lapse of time.

The controller may determine that debris has been introduced into the debris box when the amount of the beams received by the light receiver is reduced to a first reference value or below for a predetermined time, and is then returned to an original value.

The controller may determine that debris has been accumulated in the debris box in the predetermined amount, when the amount of the received beams is reduced to a second reference value or below, and is then maintained at the second reference value or below.

The controller may determine that debris is trapped by an inlet of the debris box or debris overflows when a phenomenon that the amount of the beams received by the light receiver is reduced to a third reference value or below, and is then returned to an original value is repeated for a predetermined time.

The light emitter and the light receiver may be arranged to face each other at a point where a path, along which debris is introduced, crosses an outline of a shape formed by the debris accumulated in the debris box in the predetermined amount.

The debris box may be made of a material capable of allowing the beams emitted from the light emitter to pass through the debris box, to enable the beams to be received by the light receiver.

The light emitter and the light receiver may be installed at a position equal to or higher than a level of a threshold of the debris box, at which debris introduced into the debris box may escape from the debris box or debris accumulated in the debris box may overflow.

The installation position equal to or higher than the threshold level of the debris box may be biased toward the debris box.

The installation position equal to or higher than the threshold level of the debris box may be arranged between the threshold of the debris box and a top of the debris box while being closer to the threshold than to the top.

The controller may discriminate regions to be cleaned between a region, from which debris is detected, and a region, from which no debris is detected, and may control the robot cleaning device to clean the region, from which debris is detected, in a repeated manner or in accordance with a predetermined pattern.

The controller may control the robot cleaning device to escape from the region when a cleaning operation of the robot cleaning device for one region is repeated a predetermined number of times or for a predetermined time.

The robot cleaning device may further include a maintenance station, with which the robot cleaning device docks to check a malfunction of the debris detecting unit. When the robot cleaning device repeatedly cleans one region in spite of non-detection of debris, due to malfunction of the debris detecting unit, the controller may control the robot cleaning device to dock with the maintenance station or inform a user of the malfunction of the debris detecting unit.

The controller may perform a control operation to empty the debris box when it is determined by the debris detecting unit that debris has been accumulated in the debris box in the predetermined amount, debris is trapped by an inlet of the debris box, or debris overflows.

The robot cleaning device may further include a maintenance station to generate a flow of air to suck air from the debris box, thereby emptying the debris box. The controller may control the robot cleaning device to dock with the maintenance station.

The controller may control the robot cleaning device to dock with the maintenance station when it is determined that the debris detecting unit malfunctions, debris has been accumulated in the debris box in the predetermined amount, debris is trapped by the inlet of the debris box, or debris overflows.

In accordance with another aspect, a robot cleaning device may include a body, a driving unit to enable the body to travel, a drum brush unit provided at the body, to sweep up debris, using a brush and a rotating drum, a debris box to store the debris swept up by the drum brush unit, a debris detecting unit to detect whether debris has been introduced into the debris box through the drum brush unit during a cleaning operation, the debris detecting unit possibly including a light emitter to emit beams and a light receiver to receive the emitted beams, and a controller to determine whether debris is introduced into the debris box and whether debris has been accumulated in the debris box in a predetermined amount, based on introduction or non-introduction of debris detected by the debris detecting unit, wherein the debris detecting unit may include at least one reflector or refractor to reflect or refract the beams emitted from the light emitter along a predetermined path so that the emitted beams are received by the light receiver.

In accordance with another aspect, a debris detecting unit may include a light emitter to emit beams, a light receiver to receive the emitted beams, and at least one reflector or refractor to reflect or refract the beams emitted from the light emitter along a predetermined path so that the emitted beams are received by the light receiver, thereby the debris detecting unit may detect introduction or non-introduction of debris.

In accordance with another aspect, a robot cleaning device may include a body, a driving unit to enable the body to travel, a drum brush unit provided at the body, to sweep up debris, using a brush and a rotating drum, a debris box to store the debris swept up by the drum brush unit, a debris detecting unit to detect whether debris has been introduced into the debris box through the drum brush unit during a cleaning operation, and a controller to determine an amount of debris introduced into the debris box, based on a detection signal from the debris detecting unit, to compare the determined debris amount with at least two predetermined reference values, and to control the robot cleaning device to perform cleaning operations in a stepwise manner in accordance with results of the comparison.

The debris detecting unit may include a light emitter to emit beams, and a light receiver to receive the emitted beams. The controller may determine the amount of debris introduced into the debris box in accordance with an amount of the beams received by the light receiver.

The stepwise cleaning operations may have different cleaning levels according to the results of the comparison of the determined debris amount with the at least two reference values, respectively.

The controller may compare the determined debris amount with a first reference value and a second reference value, and may control the robot cleaner to perform a first cleaning operation when the determined debris amount is less than or equal to the first reference value, to perform a second cleaning operation when the determined debris amount is greater than the first reference value, but less than or equal to the second reference value, and to perform a third cleaning operation when the predetermined debris amount is greater than the second reference value.

The controller may control the first to third cleaning operations of the robot cleaning device such that a higher one of the first to third cleaning operations has a higher one of the cleaning levels.

BRIEF DESCRIPTION OF THE DRAWINGS

These and/or other aspects of the invention will become apparent and more readily appreciated from the following description of the embodiments, taken in conjunction with the accompanying drawings of which:

FIGS. 9A to 10 are flowcharts illustrating a cleaning procedure of the robot cleaner carried out when the debris detecting unit malfunctions during introduction of debris, in accordance with an exemplary embodiment;

DETAILED DESCRIPTION

Figure 1:
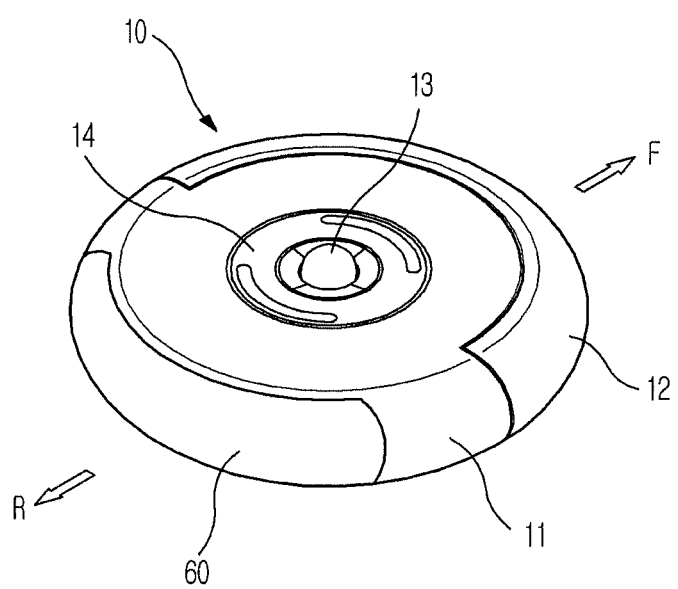
FIG. 1 is a perspective view illustrating a robot cleaning device according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, a debris detecting unit and a robot cleaning device according to embodiments will be described with reference to the accompanying drawings.

Figure 2:
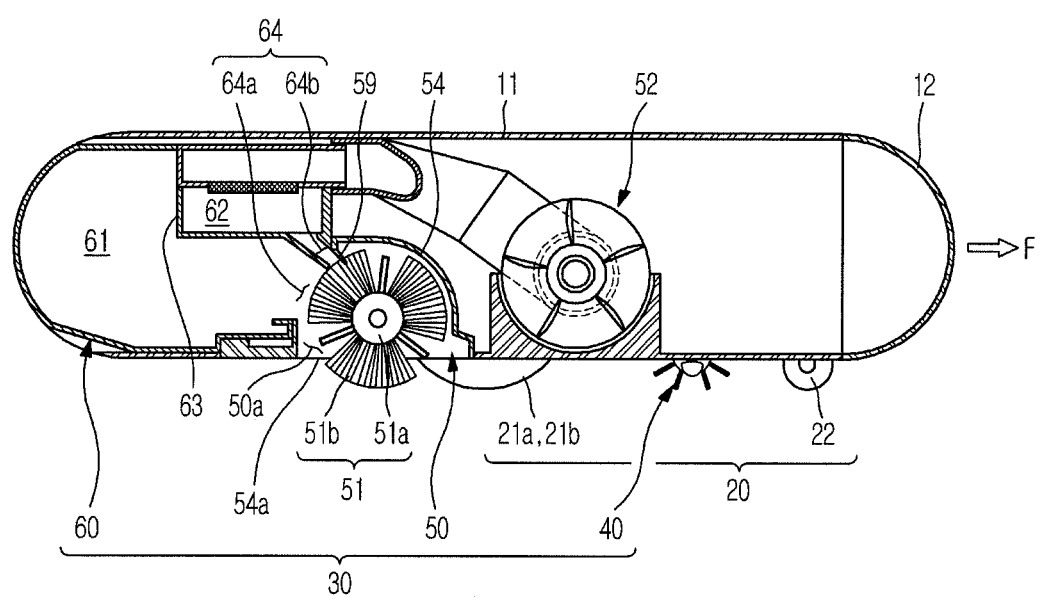
FIG. 2 is a sectional view illustrating a configuration of the robot cleaning device according to an exemplary embodiment.
Figure 3:
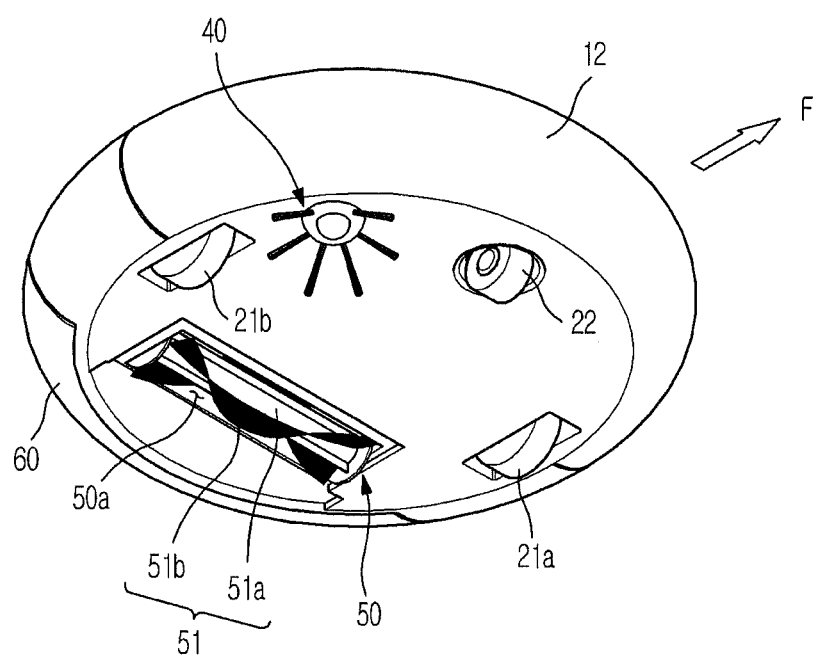
FIG. 3 is a perspective view illustrating a bottom of the robot cleaning device according to an embodiment.

FIG. 1 is a perspective view illustrating a robot cleaning device according to an exemplary embodiment. FIG. 2 is a sectional view illustrating a configuration of the robot cleaning device according to an exemplary embodiment. FIG. 3 is a perspective view illustrating a bottom of the robot cleaning device according to an embodiment.

As shown in FIGS. 1 to 3, the robot cleaning device 10 may include a body 11, a driving unit 20, a cleaning unit 30, and a controller (not shown).

The body 11 may have various shapes. For example, the body 11 may have a circular shape. When the body 11 has a circular shape, it may be prevented from coming into contact with surrounding obstacles and may easily achieve direction change because it has a constant radius of rotation. Also, it may be possible to prevent the body 11 from being obstructed by a surrounding obstacle during travel thereof. Thus, the body 11 cannot be trapped by an obstacle during travel thereof.

Various constituent elements to perform cleaning tasks, that is, the driving unit 20, the cleaning unit 30, various sensors, for example, sensors 12 and 13, the controller (not shown), and a display 14, may be installed on the body 11.

The driving unit 20 may enable the body 11 to travel about a region to be cleaned. The driving unit 20 may include left and right driving wheels 21a and 21b, and a caster 22. The left and right driving wheels 21a and 21b may receive power from a motor (not shown). The left and right driving wheels 21a and 21b may be mounted to a central portion of a bottom of the body 11. The caster 22 may be mounted to a front portion of the bottom of the body 11, to maintain stability of the body 11.

Meanwhile, each of the left and right driving wheels 21a and 21b, and the caster 22 may be configured into a single assembly detachably mounted to the body 11.

The cleaning unit 30 may clean the region underneath the body 11 and a surrounding area thereof. The cleaning unit 30 may include a side brush 40, a drum brush unit 50, and a debris box 60.

The side brush 40 may be rotatably mounted to a peripheral portion of the bottom of the body 11 at one side of the body 11. The side brush 40 may be mounted at a position spaced apart from the central portion of the body 11 in a forward direction F while being biased toward one side of the body 11.

The side brush 40 may move debris accumulated around the body 11 to a floor region underneath the body 11. The side brush 40 may expand the cleaning zone of the robot cleaning device 10 to the floor region underneath the body 11 and a surrounding area thereof. In particular, the side brush 40 may sweep debris accumulated at a boundary between a floor and a wall, namely, a corner.

The drum brush unit 50 may be arranged at a position other than the central portion of the bottom of the body 11. That is, the drum brush unit 50 may be arranged at a position biased from the driving wheels 21a and 21b disposed at the central portion of the bottom of the body 11 in a rearward direction R of the body 11.

The drum brush unit 50 may sweep debris accumulated on a floor beneath the body 11. The drum brush unit 50 may include a debris inlet 50a, which forms a debris introduction path. The drum brush unit 50 may also include a brush unit 51 arranged at the debris inlet 50a to sweep up debris from the floor.

The brush unit 51 may include a roller 51a, and a brush 51b fixed to an outer peripheral surface of the roller 51a. The roller 51a may receive power from a motor (not shown). When the roller 51a rotates, the brush 51b may sweep up debris accumulated on the floor. The brush 51b may be made of a steel body, although embodiments are not limited thereto. The brush 51b may be made of various materials having elasticity.

The brush unit 51 may be controlled to rotate at a constant speed, in order to exhibit a uniform cleaning performance. When the brush unit 51 cleans a rough floor surface such as a carpet, the rotating speed thereof may be lowered, as compared to the case in which the brush unit 51 cleans a smooth floor surface. In this case, an increased amount of current may be supplied to keep the speed of the brush unit 51 constant.

The debris box 60 may be mounted to a rear portion of the body 11. The debris box 60 may include an inlet 64 communicating with the debris inlet 50a of the drum brush unit 50. Accordingly, debris swept by the brush unit 51 may be stored in the debris box 60 after passing through the dust inlet 50a.

The debris box 60 may be divided into a larger debris box 61 and a smaller debris box 62 by a partition 63. To correspond to this structure, the inlet 64 may be divided into a first inlet 64a arranged at the inlet of the larger debris box 61 and a second inlet 64b arranged at the inlet of the smaller debris box 62.

The brush unit 51 may sweep debris having a relatively-large size into the larger debris box 61. A fan unit 52 may be provided to suck small floatable debris such as hairs, and thus to store the debris in the smaller debris box 62. In particular, a brush cleaning member 59 may be arranged at a position adjacent to the second inlet 64b. The brush cleaning member 59 may remove hairs wound around the brush unit 51, and then collect the removed hairs in the smaller debris box 62, using a suction force of the fan unit 22.

Meanwhile, each of the drum brush unit 50, side brush unit 51, and debris box 60 may be configured into a single assembly detachably mountable to the body 11.

The sensors may include a proximity sensor 12 and/or a vision sensor 13.

For example, when the robot cleaning device 10 travels in any direction under the condition that the robot cleaning device 10 has no predetermined path, namely, in a cleaning system having no map, the robot cleaning device 10 may travel about a cleaning region, using a proximity sensor 12. On the other hand, when the robot cleaning device 10 travels along a predetermined path, namely, in a cleaning system requiring a map, a vision sensor 13 may be installed to receive position information of the robot cleaning device 10 and to generate a map based on the received position information. The vision sensor may be an embodiment of a position recognition system. This function may be implemented using various systems.

The display 14 may display various states of the robot cleaning device 10. For example, the display 14 may display a battery charge state, information about whether the debris box 60 is full of debris, and the mode of the robot cleaning device 10, for example, a cleaning mode or a rest mode, etc.

The controller (not shown) may control the driving unit 20 and cleaning unit 30, to enable the cleaning operation to be efficiently carried out. The controller may enable the robot cleaning device 10 to escape from an obstacle and to change travel modes in accordance with signals received from the sensors 12 and 13.

Also, the controller may receive a signal from a debris detecting unit 70 (FIGS. 4 and 5), to determine whether the debris box 60 is full of debris. When it is determined that the debris box 60 is full of debris, the controller may enable the robot cleaning device 10 to dock with a maintenance station (not shown) in order to automatically empty the debris box 60, or to issue an alarm to the user.

The controller may also enable the robot cleaning device 10 to perform a cleaning operation while discriminating between a region from which debris is introduced into the robot cleaning device 10 and a region from which no debris is introduced into the robot cleaning device 10 based on the signal received from the debris detecting unit 70. For example, in the region from which debris is introduced, the controller may control the robot cleaning device 10 to travel repeatedly, to reduce the travel speed thereof, or to increase the rotating force of the brush unit 51 or the suction force of the fan unit 51 in order to achieve an enhancement in cleaning efficiency. On the other hand, in the region from which no debris is introduced, the controller may designate the cleaning order for this region to a later order or to reduce the number of times the robot cleaning device 10 travels in the region.

Hereinafter, operations of detecting whether or not debris has been introduced into the robot cleaning device and detecting the amount of debris stored in the debris box in accordance with embodiments will be described with reference to FIGS. 4A to 5B.

Figure 4A:
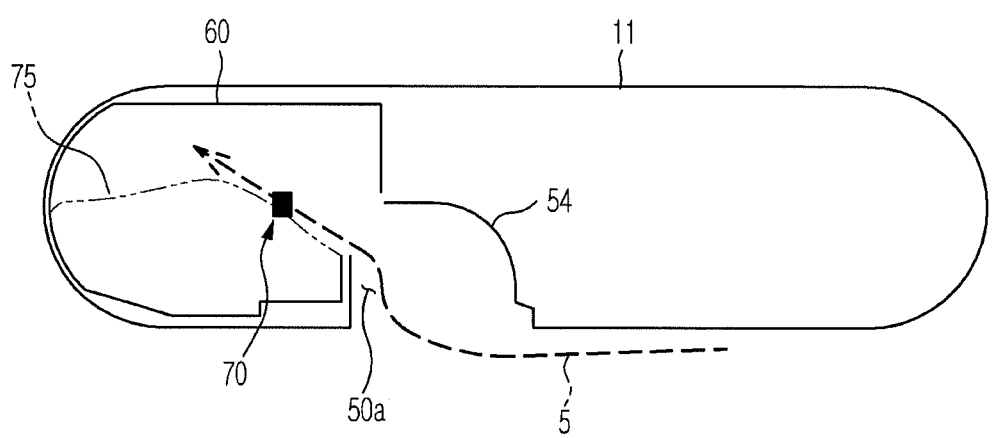
FIG. 4A is a sectional view illustrating operations of detecting whether or not debris has been introduced into the robot cleaning device and detecting the amount of debris stored in the debris box in accordance with an embodiment.
Figure 5A:
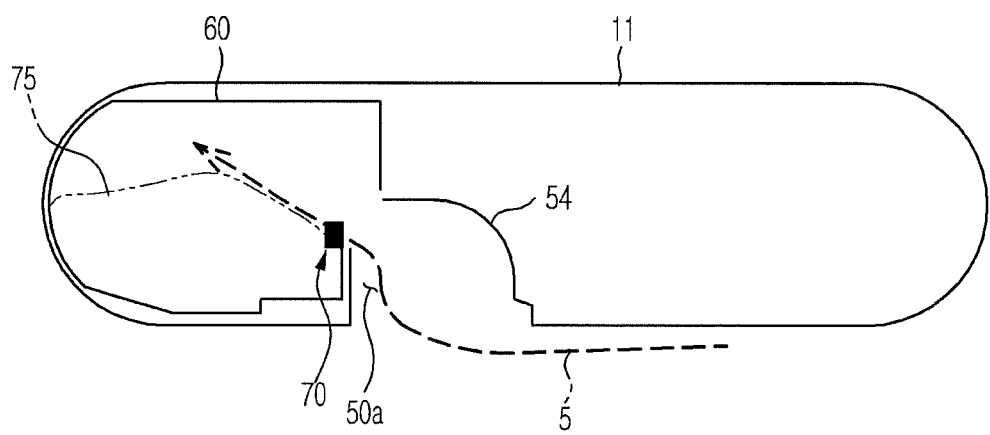
FIG. 5A is a sectional view illustrating operations of detecting whether or not debris has been introduced into the robot cleaning device and detecting the amount of debris stored in the debris box in accordance with another embodiment.

FIG. 4A is a sectional view illustrating operations of detecting whether or not debris has been introduced into the robot cleaning device and detecting the amount of debris stored in the debris box in accordance with an embodiment. FIG. 5A is a sectional view illustrating operations of detecting whether or not debris has been introduced into the robot cleaning device and detecting the amount of debris stored in the debris box in accordance with another embodiment.

As shown in FIGS. 4A and 5A, it may be possible to simultaneously detect introduction of debris and the amount of introduced debris, using the single debris detecting unit 70. The debris detecting unit 70, which may include the light emitter 71 and light receiver 72, may be installed outside the debris box 60 such that the debris detecting unit 70 and debris box 60 face each other. The light emitter 71 and light receiver 72 of the dust detecting unit 70 may be of a facing type or a reflection type.

First, the robot cleaner shown in FIG. 4A will be described. When the drum brush unit 50 sweeps up debris, the swept debris may be introduced into the debris box 60 through the inlet 50a. The debris introduced into the debris box 60 may move along a predetermined path 5. As debris is continuously introduced, the amount of debris in the debris box 60 may reach a predetermined amount. This state may be estimated to be a debris-full state. In this state, the debris may form a certain shape 75 in the debris box 60. The debris detecting unit 70 may detect whether debris has been introduced into the debris box 60 via the drum brush unit 50. The debris detecting unit 70 may detect whether debris has been introduced into the debris box 60 via the drum brush unit 50. Based on the detection as to whether debris has been introduced into the debris box 60, the controller may detect debris present in the debris movement path 5 while determining whether the amount of debris filled in the debris box 60 reaches a predetermined amount.

That is, the robot cleaning unit 10 may receive debris during a cleaning operation thereof, and the received debris may be accumulated in the debris box 60. When debris accumulated in the debris box 60 reaches the position of the debris sensing unit 70, light from the light emitter 71 may not be transmitted to the light receiver 72 because the light emitter 71 and light receiver 72 of the debris detecting unit 70 may be arranged in the debris movement path 5 while facing each other. In this case, there may be a phenomenon that the sensitivity of the light receiver 72 to receive light is abruptly reduced. Accordingly, it is possible to simultaneously detect introduction of debris and the predetermined amount of debris.

Thus, the dust detecting unit 70 may be installed at a position where the dust detecting unit 70 may simultaneously detect debris moving along the debris movement path 5 and whether the amount of debris in the debris box 60 reaches a predetermined amount representing a debris-full state. As shown in FIG. 4A, the debris detecting unit 70 may be installed inside or outside the debris box 60 so as to detect a region where the debris movement path 5 crosses an outline of a shape formed by debris in the debris-full state.

Here, the installation positions of the light emitter 71 and light receiver 72 in the debris detecting unit 70 may be higher than the level of a threshold of the debris box 60 at which debris introduced into the debris box 60 may escape from the debris box 60 or debris accumulated in the debris box 60 may overflow. That is, the debris detecting unit 70 may be installed in order to detect an installation position thereof equal to or higher than the threshold level of the inlet of the debris box 60.

The installation position equal to or higher than the threshold level of the debris box 60 may be biased toward the debris box 60. This means that the position detected by the debris detecting unit 70 may not be arranged at the side of the body 11 of the robot cleaning device 10, but may be arranged at the side of the debris box 60.

The installation position higher than the threshold level of the debris box 60 may be arranged between the threshold of the debris box 60 and the top of the debris box 60 while being closer to the threshold than to the top. That is, although the debris detecting unit 70 may be installed to detect a region around the debris box 60, the debris detecting unit 70 may be desirably installed at a position higher than the level of the threshold of the debris box 60, but closer to the threshold than to the top of the debris box 60, in order to exhibit an optimal detection performance. The distance between the installation position and the threshold may be variable in accordance with the kind of debris.

During introduction of debris, the debris detecting unit 70 may determine whether debris is introduced into the debris box 60. When the debris box 60 is filled with a predetermined amount of debris as debris is introduced and accumulated in the debris box 60, the debris detecting unit 70 may also determine a debris-full state of the debris box 60. That is, it may be possible to simultaneously determine whether debris is introduced and whether the debris box 60 is filled with a predetermined amount of debris (full state), using the single debris detecting unit 70. Discriminate detection of introduction of debris and a full state of the debris box 60 may be achieved based on signals from the debris detecting unit 70 depicted in FIGS. 6 and 7, as will be described later.

Next, the robot cleaning device shown in FIG. 5A will be described. Similarly to the robot cleaning device shown in FIG. 4A, in the robot cleaning device of FIG. 5A, when the drum brush unit 50 sweeps up debris, the swept debris may be introduced into the debris box. The debris introduced into the debris box 60 may move along a predetermined movement path 5. As debris is continuously introduced, the amount of debris in the debris box 60 may reach a predetermined amount. The debris may form a certain shape 75 in the debris box 60. At this time, the debris detecting unit 70 may detect debris present on the debris movement path 5. Based on this detection, the debris detecting unit 70 may determine whether debris is introduced into the debris box 60, and whether the amount of debris accumulated in the debris box 60 reaches a predetermined amount.

The robot cleaning device 10 according to the embodiment of FIG. 5A may be different from the robot cleaning device 10 according to the embodiment of FIG. 4A in that the debris detecting unit 70 may be installed to detect a region at the side of the inlet of the debris box 60.

This embodiment may be adapted not only to determine whether debris is introduced into the debris box 60, but also to determine whether debris accumulated in the debris box 60 overflows as it fills the debris box 60 or debris is trapped by the inlet of the debris box 60 (in a state in which debris has not been accumulated in the predetermined amount yet), in accordance with the detection operation of the debris detecting unit 70. That is, there may be a situation that, during accumulation of debris in the debris box 60, debris is trapped by the inlet of the debris box 60 without moving into the debris box 60, or although debris is accumulated in the predetermined amount, it does not form a corresponding shape detectable by the debris detecting unit 70.

Determination of such a situation may be achieved through discriminate detection of introduction of debris and accumulation of debris in the debris box 60 in the predetermined amount (a state in which debris flaps at the inlet of the debris box 60 due to accumulation thereof at the inlet). The discriminate detection may be achieved based on signals from the debris detecting unit 70 depicted in FIGS. 6 to 8, as will be described later.

Figure 4B:
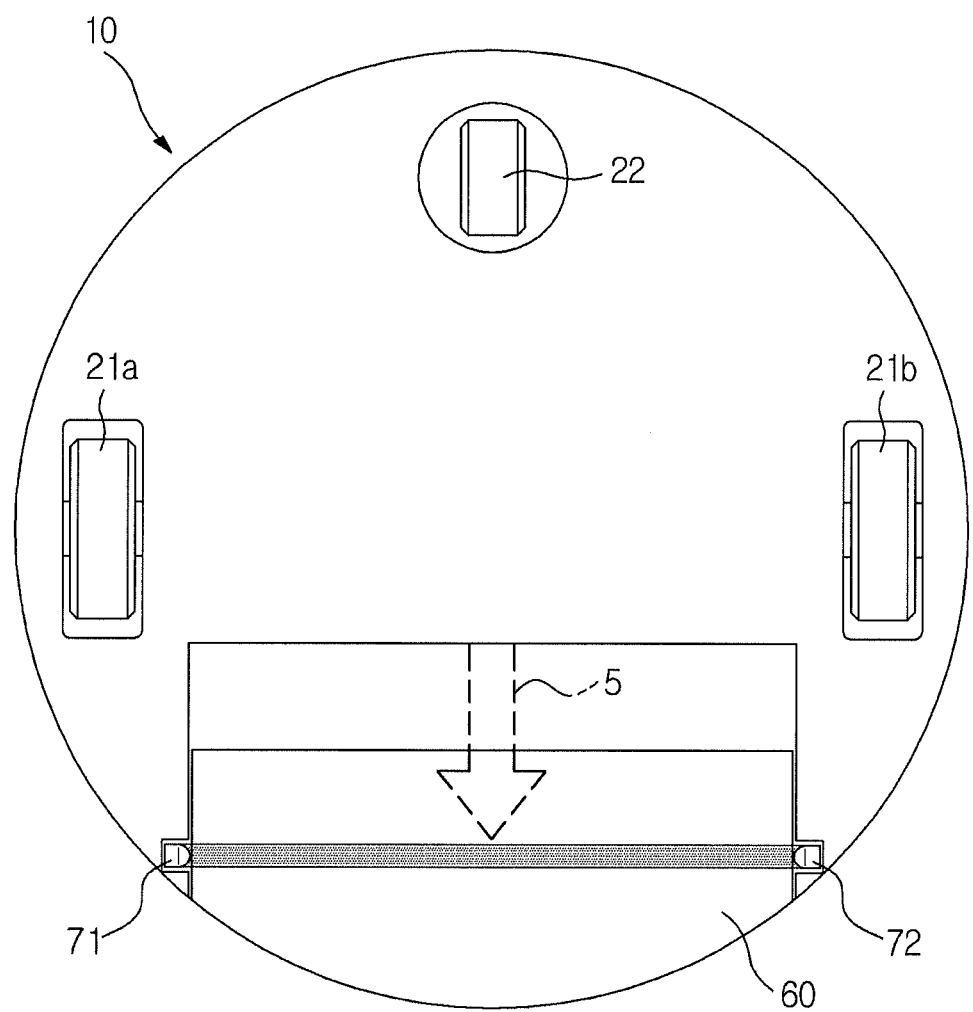
FIG. 4B is a schematic view illustrating operations of detecting whether or not debris has been introduced into the robot cleaning device and detecting the amount of debris stored in the debris box in accordance with the embodiment of FIG. 4A.
Figure 5B:
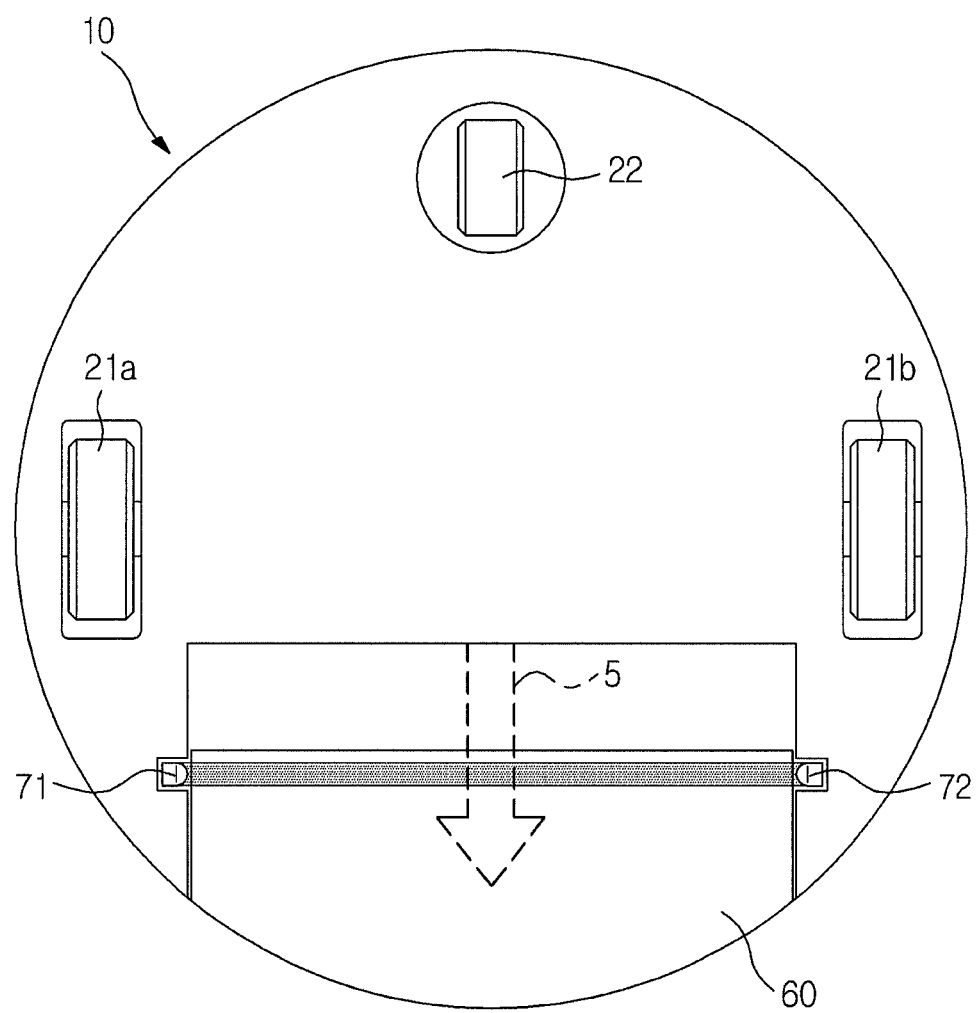
FIG. 5B is a schematic view illustrating operations of detecting whether or not debris has been introduced into the robot cleaning device and detecting the amount of debris stored in the debris box in accordance with the embodiment of FIG. 5A.

FIG. 4B is a schematic view illustrating operation of the debris detecting unit according to an exemplary embodiment. FIG. 5B is a schematic view illustrating operation of the debris detecting unit according to another embodiment.

FIGS. 4B and 5B show bottom shapes of the robot cleaning device 10 respectively corresponding to the configurations of FIGS. 4A and 5A described above. FIGS. 4B and 5B show the shapes of the debris detecting units 70 of FIGS. 4A and 5A installed outside the debris box 60, respectively.

FIG. 4B shows the installation position of the debris detecting unit 70 corresponding to FIG. 4A. In this case, the debris detecting unit 70 may be installed outside the debris box 60. Introduction of debris and whether debris is accumulated in the debris box 60 in a predetermined amount may be determined based on the amount of the signal reaching the light receiver 72 after being emitted from the light emitter 71.

FIG. 5B shows the installation position of the debris detecting unit 70 corresponding to FIG. 5A. In this case, the debris detecting unit 70 may detect debris at the side of the inlet of the debris box 60. Based on this detection, the controller may determine introduction of debris and whether debris is trapped by the inlet of the debris box 60 or overflows due to excessive accumulation thereof.

Hereinafter, a method for discriminating between introduction of debris and filling of debris in the debris box 60 in a predetermined amount, using the single debris detecting unit 70, will be described with reference to FIGS. 6 to 8.

The controller may discriminately determine one of information as to whether debris has been introduced into the debris box 60 via the drum brush unit 50 and information as to whether the amount of debris stored in the debris box 60 reaches a predetermined amount, based on a certain pattern of a variation in the amount of beams received by the light receiver of the debris detecting unit 70 depending on lapse of time. That is, the controller may determine which one of the above-described two states corresponds to the current state, using a single signal pattern received by the light receiver 72.

Figure 6:
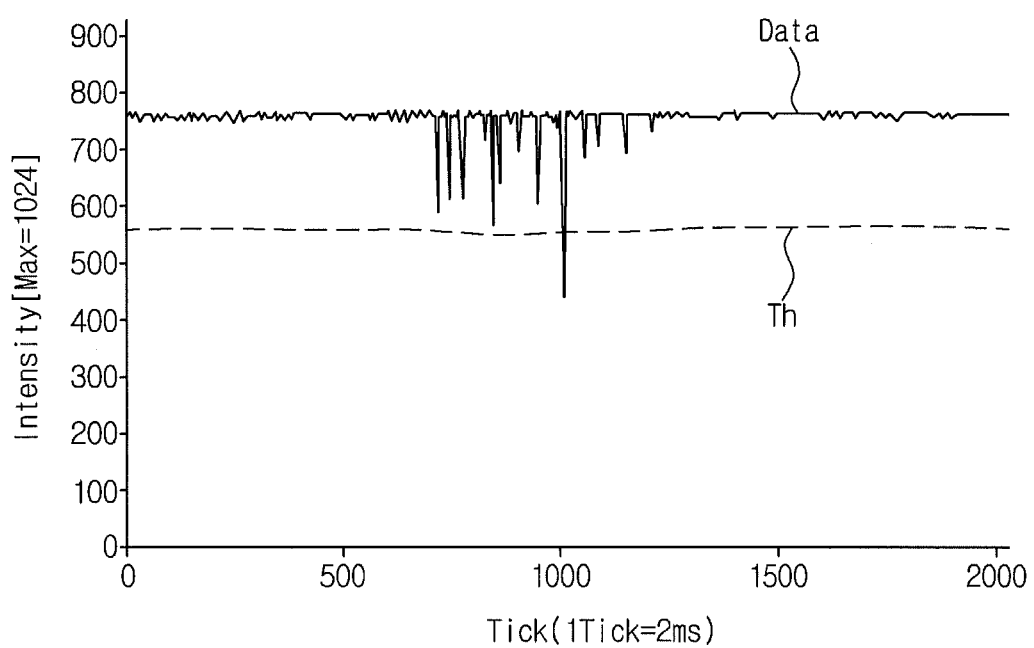
FIG. 6 is a graph depicting a signal generated when the debris detecting unit detects introduction of debris.

FIG. 6 is a graph depicting a signal generated when the debris detecting unit detects introduction of debris. FIGS. 7 and 8 are graphs respectively depicting signals generated when the debris detecting unit detects that the debris box is filled with a predetermined amount of debris.

The graph of FIG. 6 shows a state in which the signal emitted from the light emitter 71 temporarily cannot reach the light receiver 72 when debris introduced into the debris box 60 via the debris inlet 50a passes through a detection region of the debris detecting unit 70. The horizontal axis of the graph represents a time, whereas the vertical axis of the graph represents an intensity of the signal reaching the light receiver 72. Since the time, for which there is no signal reaching the light receiver 72, is increased as the size of debris is increased, it may be possible to detect the size of debris, based on the time.

The signal Data received by the light receiver 72 normally may have a value greater than a predetermined threshold value Th (first reference value). However, when debris is introduced, the value of the signal Data may be momentarily decreased to a value near the threshold value Th, and then may be increased. The time taken for the value of the signal Data to increase after decreasing may be proportional to the size of debris. Based on such a signal pattern of the debris detecting unit 70, the controller may detect whether debris is introduced.

Here, the first reference value may be a value varying to follow the value of the signal received by the light receiver 72. That is, the first reference value may not be fixed, but may be varied in proportion to variation in the value of the signal received by the light receiver 72. As shown in FIG. 6, the first reference value may be varied between a light intensity of 500 and a light intensity of 600 in accordance with variation in the amount of received light, namely, the value of the received signal Data. The intensity of received light may be varied in accordance with the kind of debris.

Figure 7:
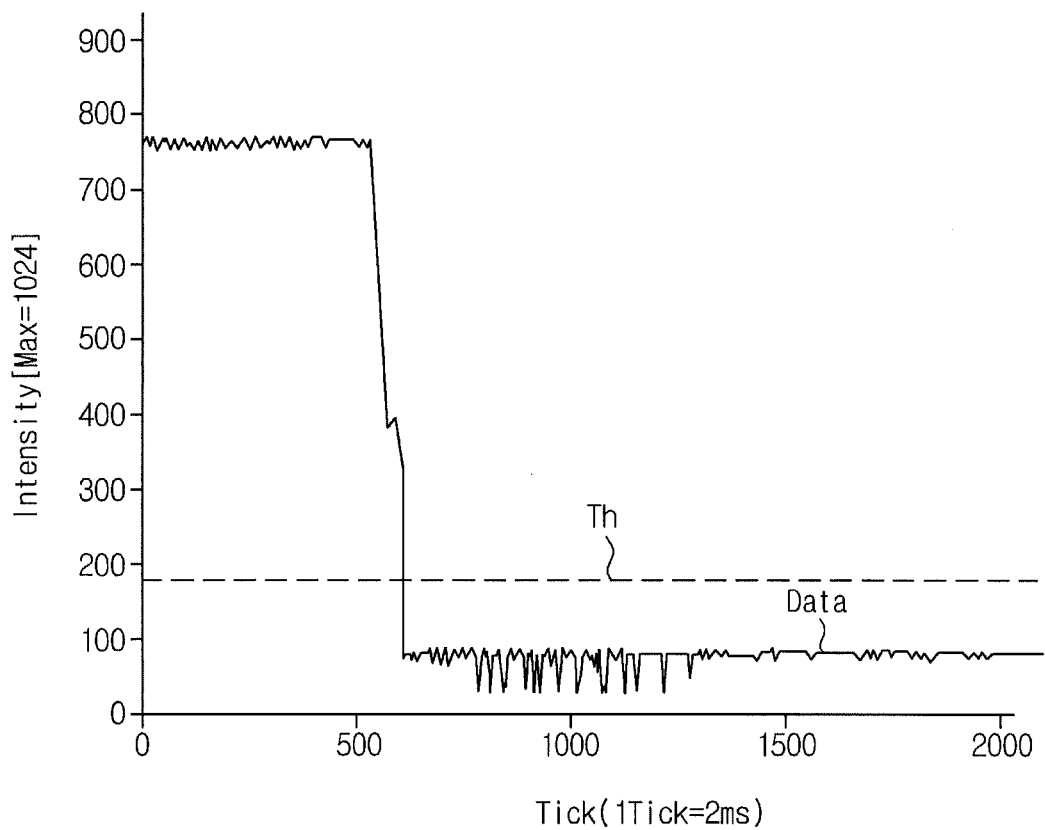
FIGS. 7 and 8 are graphs respectively depicting signals generated when the debris detecting unit detects that the debris box is filled with a predetermined amount of debris or when the debris detecting unit malfunctions.

The graph of FIG. 7 shows a state in which the signal emitted from the light emitter 71 of the debris detecting unit 70 cannot reach the light receiver 72 because the amount of debris filling the debris box 60 reaches a predetermined amount. As debris is continuously introduced into and accumulated in the debris box 60, the accumulated debris may shield the signal emitted from the light emitter 71, so that the amount of the signal received by the light receiver 72 may be gradually decreased, and may be, at last, abruptly further decreased. When the amount of the received signal Data is not higher than a predetermined critical value, namely, another threshold value Th (second reference value), it may be determined that the debris box 60 is full of the predetermined amount of debris.

The second reference value may not be a value varying to follow the value of the signal received by the light receiver 72, different than the first reference value of FIG. 6. That is, the second reference value may represent the amount of light received by the light receiver 72 when a large amount of beams emitted from the light emitter 71 cannot reach the light receiver 72 because debris is still present between the light emitter 71 and the light receiver 72 in the debris detecting unit 70.

Figure 8:
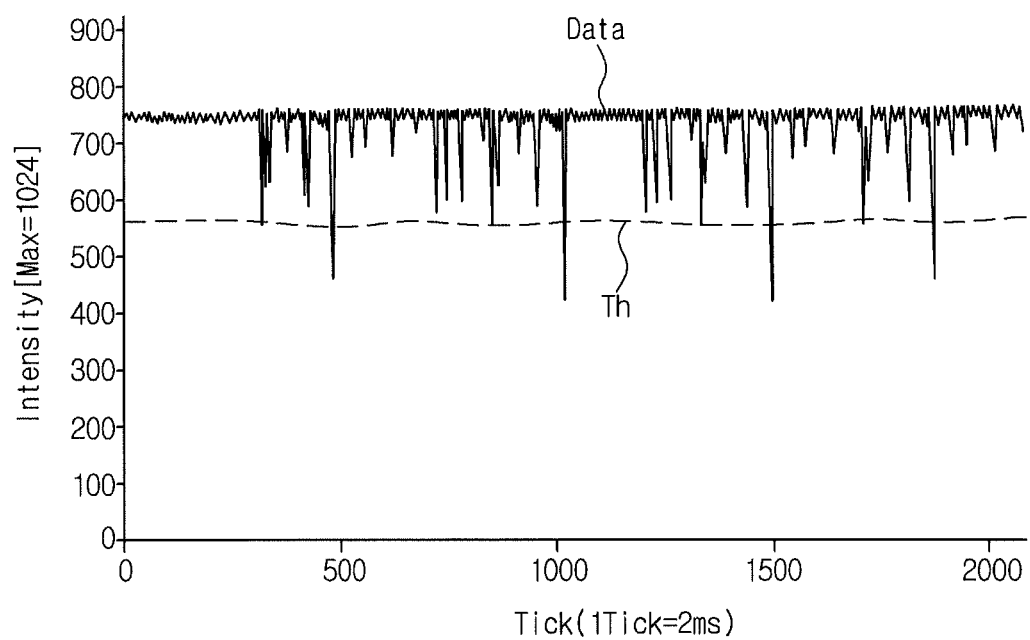

The graph of FIG. 8 depicts a signal generated when the debris detecting unit 70 is installed to detect a region at the side of the inlet of the debris box 60. The installation position of the debris detecting unit 70 associated with the graph of FIG. 7 corresponds to a position at which the debris detecting unit 70 may detect the amount of debris accumulated in the debris box 60 reaching a predetermined amount. However, the installation position of the debris detecting unit 70 associated with the graph of FIG. 8 not only corresponds to a position at which the debris detecting unit 70 may detect whether the amount of debris accumulated in the debris box 60 reaches a predetermined amount, but also corresponds to a position at which the debris detecting unit 70 may detect overflow of debris at the inlet of the debris box 60 or flapping of debris occurring due to trapping of debris by the inlet of the debris box 60 (the threshold portion of the debris box 60).

That is, the graph depicting variation in the amount of received light depending on lapse of time when the debris detecting unit 70 is arranged at the inlet of the debris box 60 may include not only the graph shown in FIG. 7, but also the graph shown in FIG. 8.

When debris overflows the debris box 60 as the debris box 60 is full of debris, or flaps in a state of being trapped by the inlet of the debris box 60, the value of the signal Data representing the amount of light received by the light receiver 72 may not be decreased below a predetermined value, namely, another threshold value Th (third reference value), but may be repeatedly exhibited for a certain time. That is, the amount of beams received by the light receiver 72 may be decreased below the third reference value, and may be then returned to an original state, and this phenomenon may be repeated for a predetermined time. Although this case is not the case in which the debris box 60 is full of debris, it may be required to be determined as a situation in which the debris box 60 needs to be emptied.

Referring to a variation in the amount of light received by the light receiver 72 depending on lapse of time, as shown in FIG. 8, it can be seen that the phenomenon that the amount of received light not higher than the third reference value is generated occurs four times within a predetermined time, namely, 2,000 Ticks (1 Tick is 2 ms). That is, in this case, introduction of debris occurs intermittently within a predetermined time. Accordingly, this case may be determined as the case in which, although there is no debris on the region, which is being currently cleaned, debris trapped by a region around the threshold of the debris box flaps or debris overflows the debris box.

Here, the third reference value may be a value varying to follow the value of the signal received by the light receiver 72. That is, the third reference value may not be fixed, but may be varied in proportion to variation in the value of the signal received by the light receiver 72. As shown in FIG. 8, the third reference value may be varied between a light intensity of 500 and a light intensity of 600 in accordance with variation in the amount of received light, namely, the value of the received signal Data.

When the signal Data received by the light receiver 72 includes a signal similar to the debris introduction detection signal, which is repeatedly generated within a predetermined time or is repeatedly generated a predetermined number of times, it may be determined that debris overflows at the inlet of the debris box 60, or debris flaps due to trapping thereof by the inlet of the debris box 60. Accordingly, in this case, it may be necessary to empty the debris box 60, as in the case in which the debris box 60 is filled with a predetermined amount of debris.

The cleaning/traveling operation of the robot cleaning device 10 carried out based on the detection through the debris detecting unit 70 as to whether debris is introduced and whether the debris box 60 is filled with a predetermined amount of debris, and a control operation of the robot cleaning device 10 carried out when the debris detecting unit 70 malfunctions will be described with reference to FIGS. 9A to 11.

First, the cleaning/traveling operation will be described.

The cleaning/traveling pattern of the robot cleaning device 10 may be implemented in various manners. For example, the robot cleaning device 10 may travel in various manners, for example, a zigzag manner, a random manner, a spiral manner, and a wall following manner. Using a vision system, it may be possible to recognize the position information of the robot cleaning device 10, and to generate a map of cleaning regions so as to enable the robot cleaning device 10 to travel along a predetermined path.

In order to enable the robot cleaning device 10 to efficiently perform a cleaning operation, the traveling pattern of the robot cleaning device 10 may be varied. That is, the controller may discriminate cleaning regions between a region from which debris is introduced and a region from which debris is not introduced based on a signal received from the debris detecting unit 70, so as to perform different cleaning tasks for the discriminated regions, respectively. For example, when the debris detecting unit 70 detects introduction of debris while the robot cleaning device 10 travels in any direction, as in a zigzag manner or in a random manner, the controller may control the robot cleaning device 10 to travel in a spiral manner in the region from which debris is introduced, and to increase the rotating force of the brush unit 51 or the suction force of the fan unit 52.

On the other hand, when the debris detecting unit 70 detects introduction of debris while the robot cleaning device 10 travels along a predetermined map, the controller may correct the map in order to repeatedly travel the debris detecting unit 70 in the region from which dust is introduced, or may correct the map such that the spacing between adjacent portions of the map is reduced to decrease the spacing between adjacent portions of the traveling path. Also, it may be possible to increase the rotating force of the brush unit 51, to increase the suction force of the fan unit 52, or to vary the travel speed. The debris-detected region may be preferentially cleaned, and the region, from which debris is not detected, may be cleaned later.

In accordance with the above-described control, the debris detecting unit 70 may accurately determine introduction of debris (or the amount of introduced debris). The robot cleaning device 10, which includes the debris detecting unit 70, may further enhance the cleaning efficiency thereof by discriminating between the region from which debris is introduced and the region from which debris is not introduced. The robot cleaning device 10 may also enhance the cleaning efficiency thereof by cleaning the cleaning regions while discriminating the cleaning regions between a region in which a large amount of debris is present and a region in which a small amount of debris is present. In this case, it may also be possible to reduce the cleaning time.

Hereinafter, a control operation of the robot cleaning device 10 carried out when the debris detecting unit 70 malfunctions will be described.

Figure 9A:
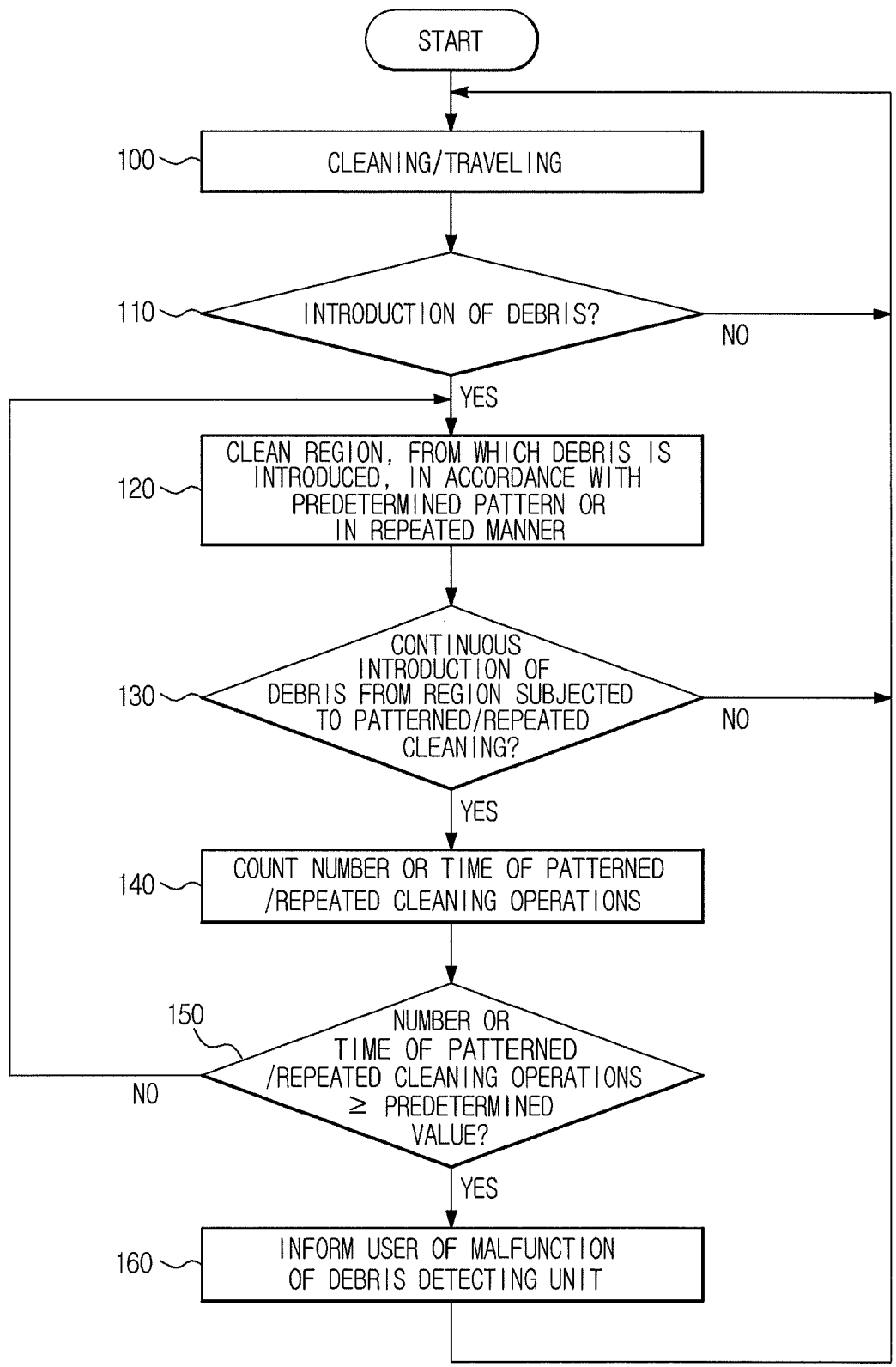
Figure 11:
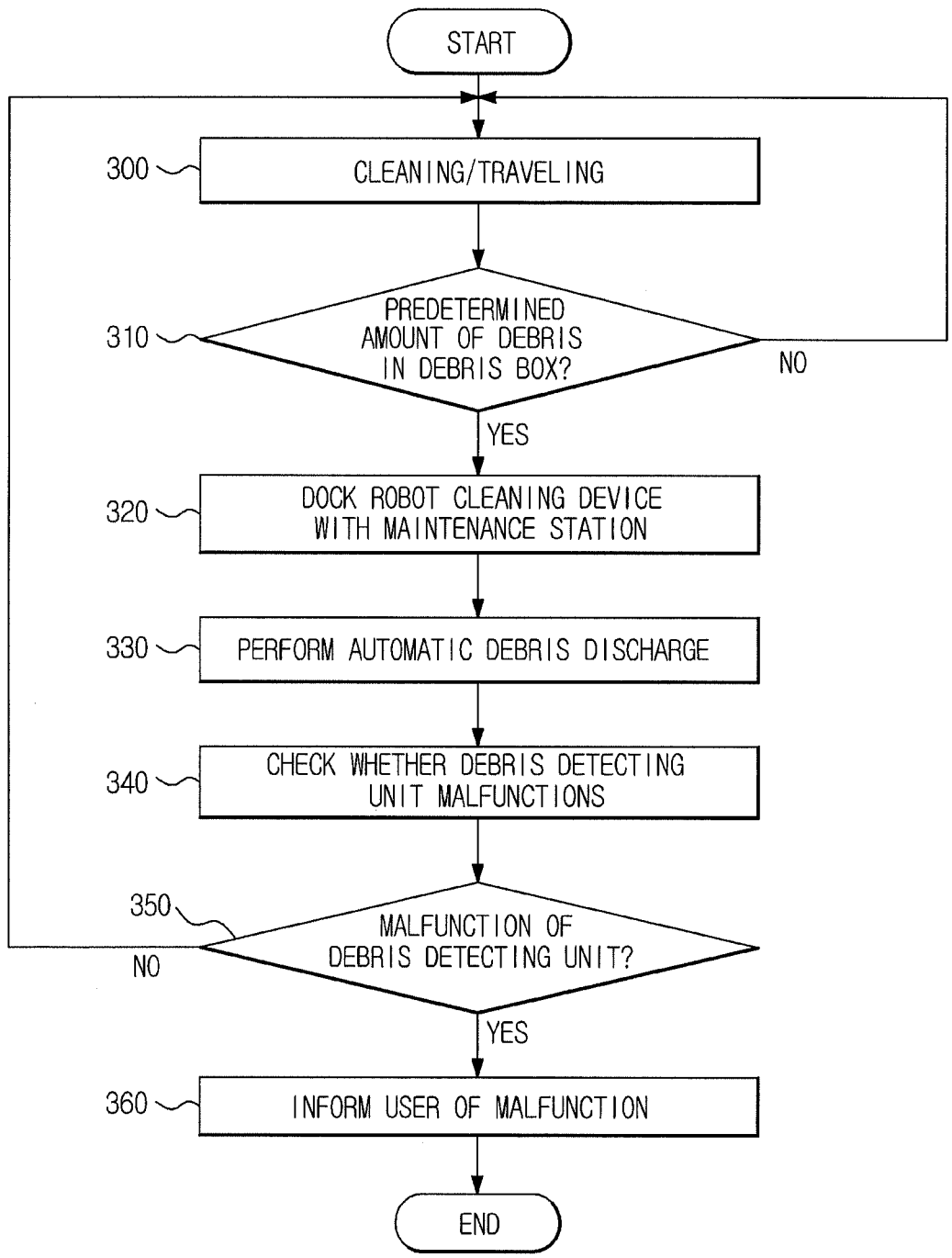
FIG. 11 is a flowchart illustrating a cleaning procedure of the robot cleaning device carried out when the debris detecting unit malfunctions, for example, when the debris detecting unit cannot detect a full state of the debris box, in accordance with an exemplary embodiment.

FIGS. 9A to 10 are flowcharts illustrating a cleaning procedure of the robot cleaner carried out when the debris detecting unit 70 malfunctions during introduction of debris in accordance with an exemplary embodiment. FIG. 11 is a flowchart illustrating operations of the robot cleaning device 10, which docks with a maintenance station (not shown) to perform automatic discharge of debris when the debris detecting unit 70 detects that the debris box 60 is filled with a predetermined amount of debris, and performs cleaning in accordance with whether the debris detecting unit 70 malfunctions.

First, a control operation of the robot cleaning device 10 carried out when the debris detecting unit 70 malfunctions during introduction of debris will be described with reference to FIGS. 9A and 9B.

Referring to FIG. 9A, the robot cleaning device 10 may determine, during a general cleaning/traveling operation thereof (100), whether debris is introduced (110). When introduction of debris is detected by the debris detecting unit 70, the robot cleaning device 10 may thoroughly clean the region from which debris is introduced, in accordance with a predetermined pattern, or may repeatedly clean the region (120). The robot cleaning device 10 may continuously detect whether debris is introduced, even during the patterned cleaning operation or the repeated cleaning operation (130). When there is no introduction of debris, the robot cleaning device 10 may return to the general cleaning/traveling operation (100), and may continuously perform a cleaning operation after moving to another region. When introduction of debris is continued, the robot cleaning device 10 may count the number or time of patterned/repeated cleaning operations (140) in order to determine whether the patterned/repeated cleaning operations are carried out due to continuous introduction of debris or malfunction (error) of the debris detecting unit 70.

The robot cleaning device 10 may then determine whether the number or time of the patterned/repeated cleaning operations is equal to or greater than a predetermined value (150). When the number or time of the patterned/repeated cleaning operations is less than the predetermined value, this state may mean that debris is continuously introduced from the current cleaning region. Accordingly, in this case, the robot cleaning device 10 may proceed to operation 120 of cleaning the current cleaning region in a patterned/repeated manner. On the other hand, when the number or time of the patterned/repeated cleaning operations is equal to or greater than the predetermined value, there may be a high possibility that the pattered/repeated cleaning operation will be carried out, although there is no introduction of debris. Accordingly, in this case, the robot cleaning device 10 may determine that the debris detecting unit 70 has malfunctioned, and may then inform the user of the malfunction of the debris detecting unit 70 (160). This information may be audibly achieved using a sound generated from the robot cleaner 10 or may be visually achieved through the display 14.

Figure 9B:
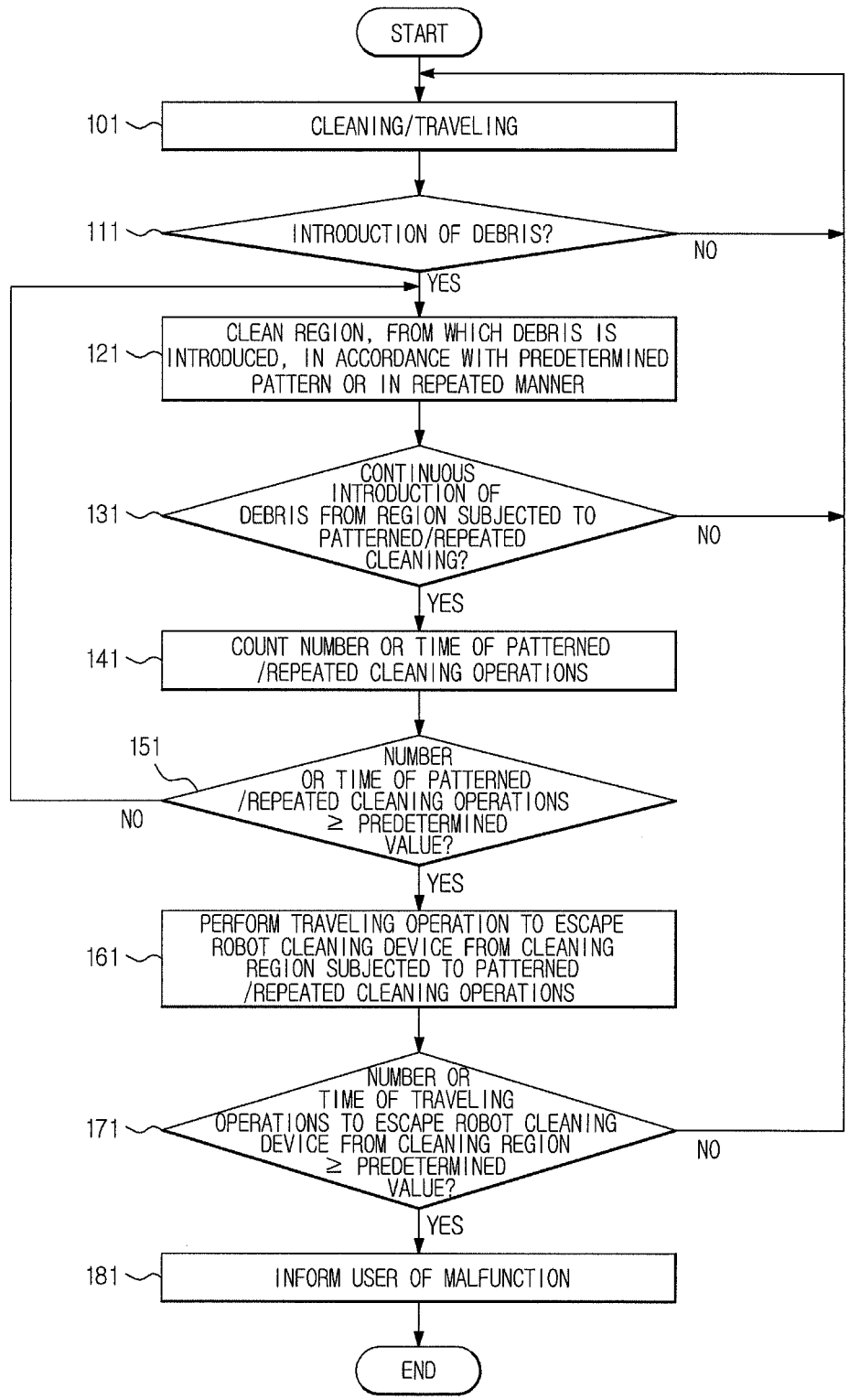

In accordance with the embodiment illustrated in FIG. 9B, different than the embodiment of FIG. 9A, the robot cleaning device 10 may perform a cleaning/traveling operation after escaping from the region in which the patterned/repeated cleaning operations have been carried out to another region when the number or time of the patterned/repeated cleaning operations is equal to or greater than the predetermined value. That is, different than the embodiment of FIG. 9A, the robot cleaning device 10 may escape from the region in which the patterned/repeated cleaning operations have been carried out to a next region without informing the user of the malfunction of the debris detecting unit 70, and then may perform a cleaning operation for the next region. When the number or time of the patterned/repeated cleaning operations carried out in the next region is also equal to or greater than the predetermined value, the robot cleaning device 10 may inform the user of the malfunction of the debris detecting unit 70. In this embodiment, it may be possible to more accurately check malfunction of the debris detecting unit 70.

Hereinafter the cleaning procedure shown in FIG. 9B will be described. First, the robot cleaning device 10 may determine, during a general cleaning/traveling operation, whether debris is introduced (101 and 111). When introduction of debris is detected by the debris detecting unit 70, the robot cleaning device 10 may thoroughly clean the region from which debris is introduced in accordance with a predetermined pattern, or may repeatedly clean the region (121). The robot cleaning device 10 may continuously detect whether debris is introduced, even during the patterned cleaning operation or the repeated cleaning operation (131). When there is no introduction of debris, the robot cleaning device 10 may return to the general cleaning/traveling operation (101), and may continuously perform a cleaning operation after moving to another region. When introduction of debris is continued, the robot cleaning device 10 may count the number or time of patterned/repeated cleaning operations (141) in order to determine whether the patterned/repeated cleaning operations are carried out due to continuous introduction of debris or a malfunction (error) of the debris detecting unit 70.

The robot cleaning device 10 may then determine whether the number or time of the patterned/repeated cleaning operations is equal to or greater than a predetermined value (151). When the number or time of the patterned/repeated cleaning operations is less than the predetermined value, this state may mean that debris is continuously introduced from the current cleaning region. Accordingly, in this case, the robot cleaning device 10 may proceed to operation 121 of cleaning the current cleaning region in a patterned/repeated manner.

On the other hand, when the number or time of the patterned/repeated cleaning operations is equal to or greater than the predetermined value, there may be a high possibility that the patterned/repeated cleaning operation will be carried out, although there is no introduction of debris. Accordingly, in this case, different than the embodiment of FIG. 9A, the robot cleaner 10 may perform a traveling operation to escape from the cleaning region in which the patterned/repeated cleaning operations have been carried out (161). Subsequently, the robot cleaning device 10 may determine whether the number or time of traveling operations to escape the robot cleaning device 10 from the cleaning region is equal to or greater than a predetermined value (171). When the number or time of traveling operations is equal to or greater than the predetermined value, it may be determined that there is a malfunction of the debris detecting unit 70. In this case, the robot cleaning device 10 may inform the user of the malfunction of the debris detecting unit 70 (181). In this embodiment, the information may also be audibly achieved using sound or may be visually achieved through the display 14.

Hereinafter, a control operation of the robot cleaning device 10 carried out when the debris detecting unit 70 malfunctions during introduction of debris, in the embodiment of FIG. 10, will be described mainly in conjunction with operations distinguishable from those of FIGS. 9A and 9B.

In the control operation of the robot cleaning device shown in FIG. 10, different than those of FIGS. 9A and 9B, when the number or time of the patterned/repeated cleaning operations is equal to or greater than a predetermined value, the robot cleaning device 10 may determine that there is malfunction of the debris detecting unit 70 (250), and may then check whether the debris detecting unit 70 has malfunctioned (260). The checking of whether the debris detecting unit 70 has malfunctioned may be carried out in various manners. For example, the robot cleaner 10 may be operated under the condition that the robot cleaner 10 docks with the maintenance station, and the drum brush unit 50 does not operate. When the debris detecting unit 70 still detects introduction of debris even in this case, it may be determined that there is a malfunction of the debris detecting unit 70 because the debris detecting unit 70 detects introduction of debris, although there is no introduction of debris.

It may also be possible to check a malfunction of the debris detecting unit 70 during the cleaning/traveling operation in a state in which the robot cleaning device 10 does not dock with the maintenance station, through the above described procedure. For example, the robot cleaning device 10 may be controlled to be changed to a checking mode. In the checking mode, the cleaning/traveling operation may be carried out along a certain path under the condition that the operation of the drum brush unit 50 is stopped. When introduction of debris is detected in the checking mode, it may be determined that there is a malfunction of the debris detecting unit 70 because the debris detecting unit 70 detects introduction of debris, although the drum brush unit 70 does not operate.

That is, the checking of whether the debris detecting unit 70 malfunctions may be achieved in any of the states in which the robot cleaning device 10 docks with the maintenance station and the general cleaning/traveling operation state.

The above-described determination as to whether the debris detecting unit 70 malfunctions may be achieved through a controller included in the debris detecting unit 70 or through a separate controller, which receives a detection signal from the debris detecting unit 70.

When it is determined that there is no malfunction of the debris detecting unit 70, the robot cleaning device 10 may return to the cleaning/traveling operation 200. On the other hand, when there is a malfunction of the debris detecting unit 70, the robot cleaning device 10 may inform the user of the malfunction of the debris detecting unit 70 (270 and 280).

Also, malfunction of the debris detecting unit 70 may be checked after the debris box 60 is emptied. That is, the robot cleaning device 10 may check whether the debris detecting unit 70 malfunctions after docking with the maintenance station and then performing an automatic debris discharge operation. When it is determined that there is a malfunction of the debris detecting unit 70, the user may be informed of this state through a sound, etc.

Finally, a control operation of the robot cleaning device 10 carried out when the debris detecting unit 70 malfunctions in conjunction with detection as to whether debris is accumulated in the debris box 60 in a predetermined amount, in an embodiment of FIG. 11, will be described.

When the debris detecting unit 70 detects a predetermined amount of debris accumulated in the debris box 60 during a cleaning/traveling operation of the robot cleaning device 10 (300), the robot cleaning device 10 may dock with the maintenance station, to empty the debris box 60. On the other hand, when the debris detecting unit 70 does not detect the predetermined amount of debris, the cleaning/traveling operation may be continued (310 and 320). After the debris box 60 is emptied in accordance with the automatic debris discharge operation carried out in response to the detection of the predetermined amount of debris (330), it may be checked whether the debris detecting unit 70 malfunctions (340). The checking of whether the debris detecting unit 70 malfunctions may be carried out in the same manner as in FIG. 10. When it is determined that the debris detecting unit 70 malfunctions, the user may be informed of this situation so that the debris detecting unit 70 can be repaired (350 and 360). When there is no malfunction of the debris detecting unit 70, the robot cleaning device 10 may return to the cleaning/traveling operation 300, to continuously perform the general cleaning/traveling operation.

Hereinafter, a debris detecting unit according to another embodiment and a robot cleaning device including the same will be described.

Figure 12:
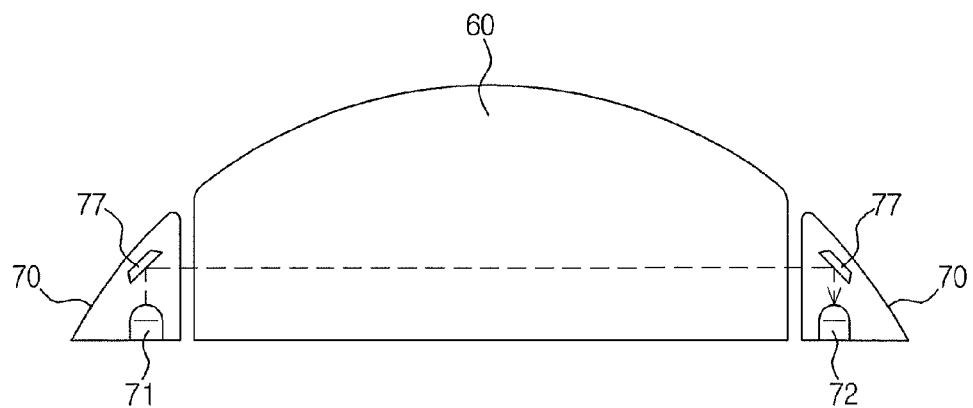
FIG. 12 is a schematic view illustrating a structure of the debris detecting unit according to another embodiment.
Figure 13:
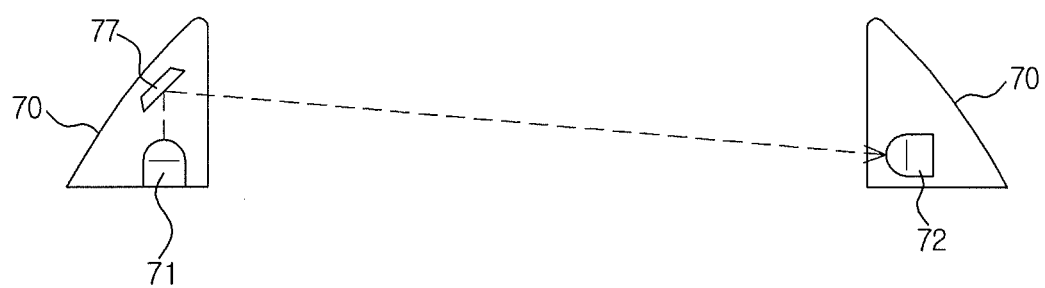
FIG. 13 is a schematic view illustrating a structure of the debris detecting unit according to another embodiment.
Figure 14:
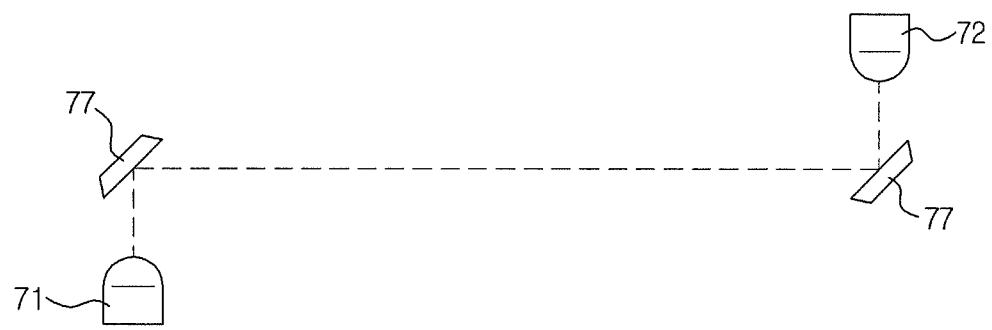
FIG. 14 is a schematic view illustrating a structure of the debris detecting unit according to another embodiment.

FIGS. 12 to 14 are various structures of a debris detecting unit installed in the robot cleaning device in accordance with different embodiments, respectively.

FIG. 12 is a schematic view illustrating a structure of the debris detecting unit 70, which may further include a reflector or refractor 77 in accordance with another embodiment. The debris detecting unit 70 may further include the reflector or refractor 77, in addition to the light emitter 71 and light receiver 72. The reflector or refractor 77 may reflect a signal emitted from the light emitter 71, to change the travel path of the signal in a desired direction. The reflector or refractor 77 may have various structures such as a lens or a mirror. In addition to the structure capable of reflecting a signal, the reflector or refractor 77 may have a structure capable of refracting a signal. That is, the reflector or refractor 77 may change the travel path of a signal by reflecting or refracting the signal.

FIG. 13 is a schematic view illustrating a structure of the debris detecting unit 70, which may include a reflector or refractor 77 to reflect a signal emitted from the light emitter 71 in a direction different from the emission direction in accordance with another embodiment. FIG. 14 is a schematic view illustrating a structure of the debris detecting unit 70 according to another embodiment.

As described above, the debris detecting unit 70 illustrated in each of FIGS. 12 to 14 may include the reflector or refractor 77. Using the debris detecting unit 70 including the reflector or refractor 77, which may have various structures, it may be possible to reduce the spaces occupied by the light emitter 71 and light receiver 72. In particular, it may be possible to eliminate the spatial installation restriction encountered in the facing type structure. That is, it may be possible to change the travel direction of the signal by installing the reflector or refractor 77, which occupies a smaller space than the installation space of the light emitter 71 and light receiver 72. Furthermore, it may be unnecessary to install the light emitter 71 and light receiver 72 such that they face each other. Thus, the debris detecting unit 70 may be freely installed at the debris box 60 installed adjacent to the drum brush unit 50 or a housing 54, without a spatial installation restriction. In addition, the signal emerging from the reflector or refractor 77 may travel after being adjusted or restricted by an auxiliary member such as a slit plate or barrel plate (not shown). Also, the debris detecting unit 70 may include one or more reflectors or refractors 77, to transmit the signal emitted from the light emitter 71 to the light receiver 72 via several paths.

The robot cleaning device 10, which includes the debris detecting unit according to the embodiment illustrated in each of FIGS. 12 to 14, may detect introduction of debris and the amount of debris stored in the debris box 60. That is, the debris detecting unit according to the embodiment including the above-described reflector or refractor 77, and the robot cleaning device 10 including the same may be not only applied to the case in which both the introduction of debris and the amount of debris stored in the debris box 60 are to be detected, as in the previous embodiments, but also may be applied to the case in which any one of the introduction of debris and the amount of debris is to be detected.

Figure 15:
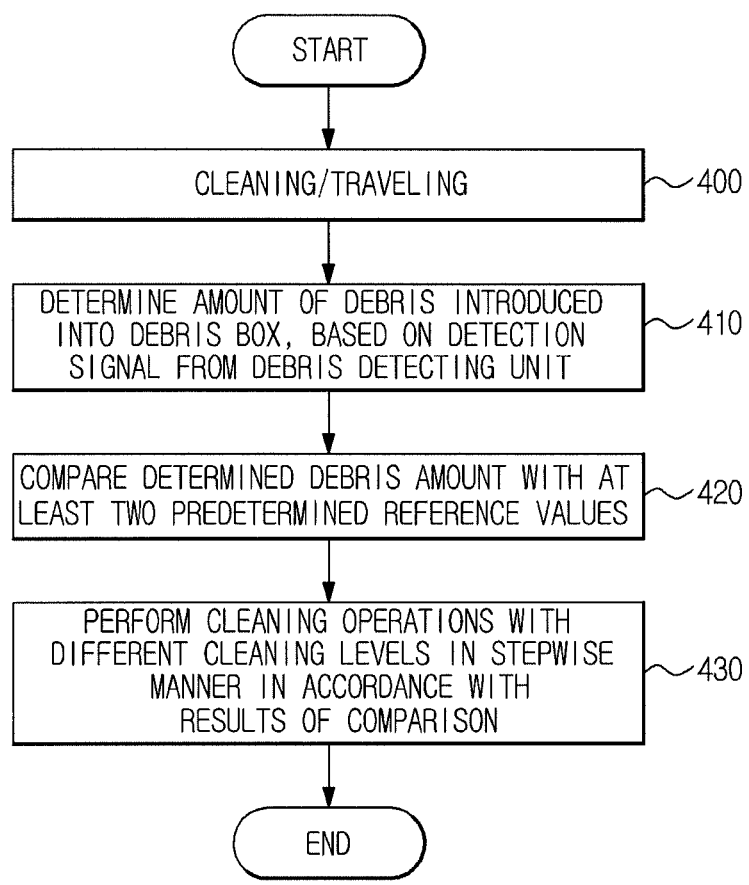
FIGS. 15 and 16 are flowcharts illustrating a cleaning procedure of the robot cleaning device according to the embodiment illustrated in each of FIGS. 12 to 14.
Figure 16:
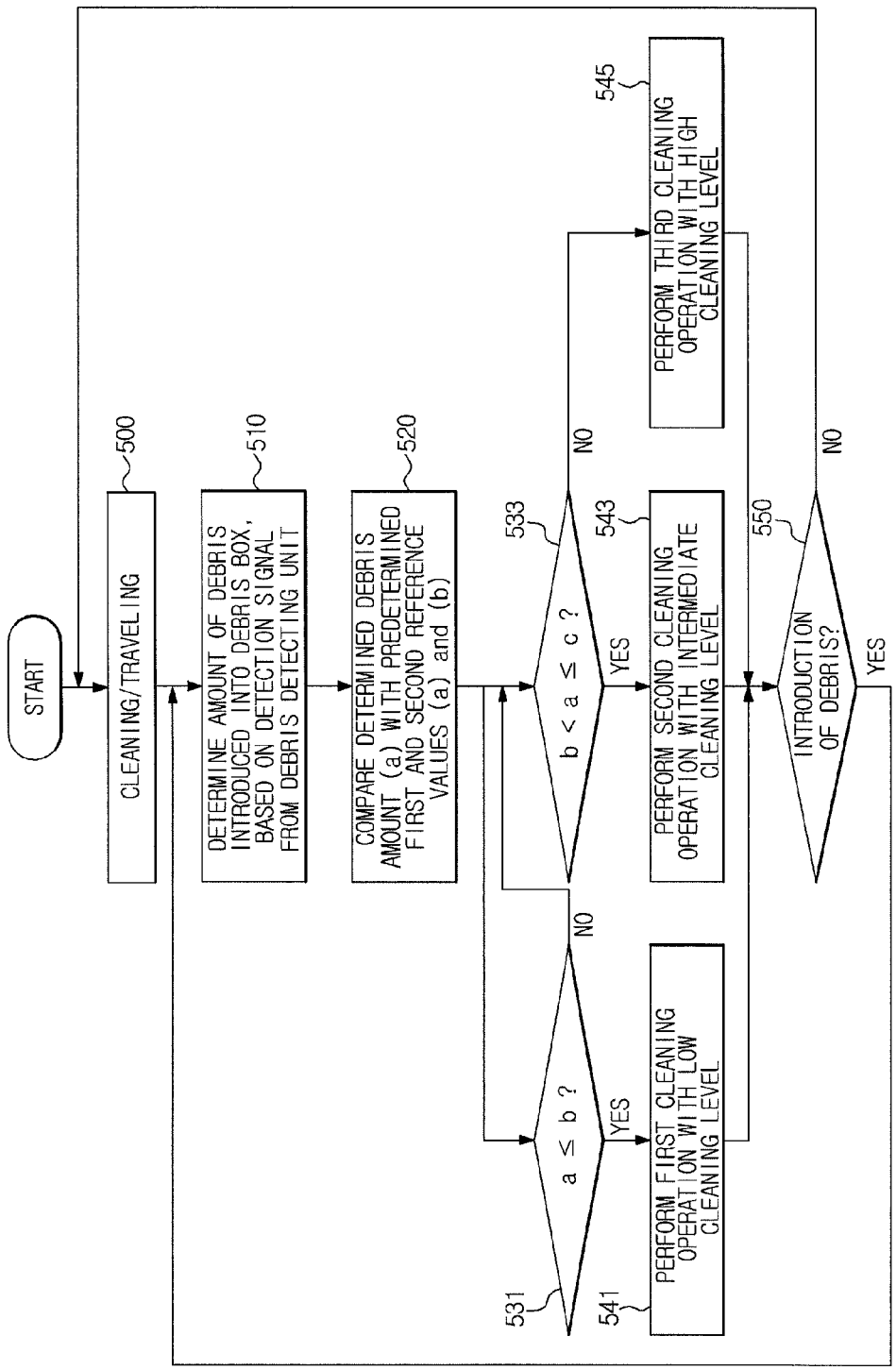

Hereinafter, a cleaning procedure of the robot cleaning device according to the embodiment illustrated in each of FIGS. 12 to 14 will be described with reference to FIGS. 15 and 16. FIGS. 15 and 16 are flowcharts illustrating a cleaning procedure of the robot cleaning device according to the embodiment illustrated in each of FIGS. 12 to 14.

In accordance with the cleaning procedure illustrated in FIGS. 15 and 16, the robot cleaning device 10 may determine the amount of debris stored in the debris box 60, based on a debris introduction detection signal generated from the debris detecting unit 70, which may be included in the robot cleaning device 10. The robot cleaning device 10 then may compare the determined debris amount with two or more predetermined reference values, to perform cleaning operations with different cleaning levels in a stepwise manner in accordance with the results of the comparison.

First, as shown in FIG. 15, the robot cleaning device 10 according to the embodiment illustrated in each of FIGS. 12 to 14 may perform a cleaning/traveling operation (400). When the debris detecting unit 70 detects introduction of debris during the cleaning/traveling operation, the robot cleaning device 10 may determine the amount of debris introduced into the debris box 60, based on the detection signal from the debris detecting unit 70. In detail, the robot cleaning device 10 may determine the amount of debris, based on the amount of beams received by the light receiver 72 of the debris detecting unit 70 from among beams emitted from the light emitter 71 of the debris detecting unit 70.

Thereafter, the robot cleaning device 10 may compare the determined debris amount with two or more predetermined reference values (420). Based on the result of the comparison, the robot cleaning device 10 may perform cleaning operations with different cleaning levels in a stepwise manner (430).

The cleaning procedure of the robot cleaning device according to the embodiment illustrated in each of FIGS. 12 to 14 will be described in more detail with reference to FIG. 16.

First, as shown in FIG. 16, the robot cleaning device 10 according to the embodiment illustrated in each of FIGS. 12 to 14 may perform a cleaning/traveling operation (500). When the debris detecting unit 70 detects introduction of debris during the cleaning/traveling operation, the robot cleaning device 10 may determine the amount of debris introduced into the debris box 60, based on the detection signal from the debris detecting unit 70. In detail, the robot cleaning device 10 may determine the amount of debris, based on the amount of beams received by the light receiver 72 of the debris detecting unit 70 from among beams emitted from the light emitter 71 of the debris detecting unit 70.

Thereafter, the robot cleaning device 10 may compare the determined debris amount, a, with first and second predetermined reference values b and c (520). In this case, two reference values are used.

When the determined debris amount a is less than or equal to the first reference value b, a first cleaning operation with a low cleaning level may be carried out (531 and 541). When the determined debris amount a is greater than the first reference value b, but less than or equal to the second reference value c, a second cleaning operation with an intermediate cleaning level may be carried out (533 and 543). On the other hand, when the determined debris amount a is greater than the second reference value c, a third cleaning operation with a high cleaning level may be carried out (545).

The cleaning levels of the first to third cleaning operations may be implemented in various manners. That is, each cleaning level may be adjusted, for example, through adjustment of the RPMs of the drum brush and side brush, adjustment of the RPMs of the robot cleaning device 10, adjustment of a travel path for repeated cleaning of the associated region, change of a travel pattern for the associated region, or execution or non-execution of a cleaning/traveling operation for the associated region.

In detail, in the cleaning procedure of FIG. 16, the first reference value may be a reference value (sensitive) set in the case in which the amount of debris is small (or the weight of debris is light), whereas the second reference value may be a reference value (insensitive) set in the case in which the amount of debris is large (or the weight of debris is heavy).

In the first cleaning operation, which has a low cleaning level, the RPMs of the drum brush and side brush may be reduced, the suction force may be reduced, or the number of repeated cleaning/traveling operations may be reduced.

In the third cleaning operation, which has a high cleaning level, the RPMs of the drum brush and side brush may be increased, the suction force may be increased, or the number of repeated cleaning/traveling operations may be increased.

Also, in the second cleaning operation, which has an intermediate cleaning level, the RPMs of the drum brush and side brush, the suction force, or the number of repeated cleaning/traveling operations may be set to an intermediate level between the level of the first cleaning operation and the level of the third cleaning operation.

As described above, cleaning may be carried out in a stepwise manner, based on two reference values. Of course, in accordance with a given cleaning environment, several reference values may be set for execution of stepwise cleaning.

After execution of one of the above-described three cleaning operations, the robot cleaning device 10 may determine, through the debris detecting unit 70, whether debris is introduced into the debris box 60 (550).

When it is determined that there is introduction of debris, the robot cleaning device 10 may return to operation 510 to determine the amount of debris. On the other hand, when there is no introduction of debris, the robot cleaning device 10 may return to operation 500 to perform a cleaning/traveling operation for another region.

In accordance with one aspect, the robot cleaner may accurately determine introduction of debris or the amount of debris.

Also, it may be possible to enhance cleaning efficiency and to reduce cleaning time by performing cleaning operations for cleaning regions while discriminating among the cleaning regions in accordance with introduction or non-introduction of debris or the amount of debris.

It may be possible to appropriately cope with malfunction of the detecting sensors to detect debris, and thus to achieve a stable cleaning operation.

In addition, it may be possible to adjust the cleaning level of the cleaning operation in accordance with the amount of introduced debris, using two or more reference values set in association with the detecting operation of the debris detecting unit, and thus to achieve an effective cleaning operation.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot cleaning device comprising:
a body;
a driving unit to enable the body to travel;
a drum brush unit provided at the body, to sweep up debris, using a brush and a rotating drum;
a debris box to store the debris swept up by the drum brush unit;
a debris detecting unit including:
a light emitter to emit light, and
a light receiver to receive the emitted light,
the light emitter and the light receiver arranged to face each other at a position where a path, along which debris moves to be introduced into the debris box via the drum brush unit, crosses an outline of a shape formed by debris accumulated in the debris box to a predetermined amount,
the light emitter and the light receiver arranged at a position higher than a level of a threshold member of the debris box, and
the debris detecting unit outputs a data signal in accordance with the light received by the light receiver; and
a controller to, based on the data signal output by the debris detecting unit, determine:
whether debris is being introduced into the debris box, and
whether debris has been accumulated in the debris box to the predetermined amount.

2. The robot cleaning device according to claim 1, wherein the controller determines whether debris is introduced into the debris box and whether debris has been accumulated in the debris box to the predetermined amount, based on a pattern of a variation in an amount of light received by the light receiver depending on a lapse of time as indicated by the data signal output by the debris detecting unit.

3. The robot cleaning device according to claim 2, wherein the controller determines that debris is being introduced into the debris box when the amount of light received by the light receiver as indicated by the data signal output by the debris detecting unit is reduced to a first reference value or below for a predetermined time, and is then returned to an original value.

4. The robot cleaning device according to claim 2, wherein the controller determines that debris has been accumulated in the debris box to the predetermined amount, when the amount of light received by the light receiver as indicated by the data signal output by the debris detecting unit is reduced to a second reference value or below, and is then maintained at the second reference value or below.

5. The robot cleaning device according to claim 2, wherein the controller determines that debris flaps in a state of being trapped by the inlet of the debris box when a phenomenon that the amount of light received by the light receiver as indicated by the data signal output by the debris detecting unit is reduced to a third reference value or below, and is then returned to an original value is repeated for a predetermined time.

6. The robot cleaning device according to claim 1, wherein the debris box is made of a material capable of allowing the light emitted by the light emitter to pass through the debris box, to thereby enable the light to be received by the light receiver.

7. The robot cleaning device according to claim 1, wherein debris introduced into the debris box may escape from the debris box or debris accumulated in the debris box may overflow at the position higher than the level of the threshold member of the debris box.

8. The robot cleaning device according to claim 7, wherein the position higher than the level of the threshold member of the debris box is biased toward the debris box.

9. The robot cleaning device according to claim 7, wherein the position or higher than the level of the threshold member of the debris box is arranged between the threshold member of the debris box and a top of the debris box while being closer to the threshold than to the top.

10. The robot cleaning device according to claim 1, wherein the controller
discriminates regions to be cleaned between a region from which debris is detected based on the data signal output by the debris detecting unit and a region from which no debris is detected based on the data signal output by the debris detecting unit, and
controls the robot cleaning device to clean the region from which debris is detected in a repeated manner or in accordance with a predetermined pattern.

11. The robot cleaning device according to claim 10, wherein the controller controls the robot cleaning device to escape from the region from which debris is detected when a cleaning operation of the robot cleaning device for the region from which debris is detected is repeated a predetermined number of times or for a predetermined time.

12. The robot cleaning device according to claim 11, further comprising:
a maintenance station, with which the robot cleaning device docks to check malfunction of the debris detecting unit,
wherein, when the robot cleaning device repeatedly cleans one region in spite of non-detection of debris, due to malfunction of the debris detecting unit, the controller controls the robot cleaning device to dock with the maintenance station or informs a user of the malfunction of the debris detecting unit.

13. The robot cleaning device according to claim 1, wherein the controller performs a control operation to empty the debris box when it is determined by the controller that debris has been accumulated in the debris box to the predetermined amount or that debris flaps in a state of being trapped by the inlet of the debris box.

14. The robot cleaning device according to claim 13, further comprising:
a maintenance station to generate a flow of air to suck air from the debris box, thereby emptying the debris box,
wherein the controller controls the robot cleaning device to dock with the maintenance station.

15. The robot cleaning device according to claim 14, wherein the controller controls the robot cleaning device to dock with the maintenance station when it is determined that the debris detecting unit malfunctions, debris has been accumulated in the debris box to the predetermined amount, debris is trapped by the inlet of the debris box, or debris overflows.

16. A robot cleaning device comprising:
   a body;
   a driving unit to enable the body to travel;
   a drum brush unit provided at the body, to sweep up debris, using a brush and a rotating drum;
   a debris box to store the debris swept up by the drum brush unit;
   a debris detecting unit comprising:
   a light emitter to emit light,
   a light receiver to receive the emitted light, and
   the debris detecting unit outputting a data signal in accordance with the light received by the light receiver; and
   a controller to, based on the data signal output by the debris detecting unit, determine:
   whether debris is being introduced into the debris box,
   whether debris has been accumulated in the debris box to a predetermined amount, and
   whether debris flaps in a state of being trapped by an inlet of the debris box.

17. The robot cleaning device according to claim 2, wherein the controller determines that debris overflows the inlet of the debris box when a phenomenon that the amount of light received by the light receiver as indicated by the data signal output by the debris detecting unit is reduced to a third reference value or below, and is then returned to an original value is repeated for a predetermined time.

\* \* \* \* \*